United States Patent

[11] 3,634,200

[72] Inventors: Robert P. Obrecht
New Canaan;
Thomas Dao, Stamford; Gilbert E.
Klingman, Westport, all of Conn.
[21] Appl. No.: 800,965
[22] Filed: Feb. 20, 1969
[45] Patented: Jan. 11, 1972
[73] Assignee: Stauffer Chemical Company
New York, N.Y.

[54] ETHYLENE DICHLORIDE PURIFICATION BY PLURAL STAGE DISTILLATION
8 Claims, 1 Drawing Fig.

[52] U.S. Cl. .................................. 203/35,
203/72, 203/81, 203/82, 203/84, 203/89, 260/652
P, 260/659 A, 260/662
[51] Int. Cl. ..................................... B01d 3/28,
C07c 19/00
[50] Field of Search ........................... 203/72, 89,
81, 74, 35, 82, 84; 260/652 P, 659 A, 660, 662,
662 A, 656

[56] References Cited
UNITED STATES PATENTS

| | | | |
|---|---|---|---|
| 2,520,870 | 8/1950 | Wood et al. | 203/72 |
| 2,589,212 | 3/1952 | Agapetus et al. | 203/37 |
| 2,895,886 | 7/1959 | Schneider | 203/72 |
| 3,092,557 | 6/1963 | Ester et al. | 203/72 |
| 3,173,963 | 3/1965 | Reiche et al. | 260/660 |
| 3,197,941 | 8/1965 | Colton et al. | 260/652 P |
| 3,378,597 | 4/1968 | Dehn et al. | 260/652 P |
| 3,420,749 | 1/1969 | Dehn | 260/652 |
| 3,488,398 | 1/1970 | Harping et al. | 260/659 A |
| 3,506,727 | 4/1970 | Mulders | 260/662 |

Primary Examiner—Wilbur L. Bascomb, Jr.
Attorneys—Edwin H. Baker, Bruce E. Hosmer, Albert J. Adamcik and Daniel C. Block ABSTRACT: A purification separation of the residual ethylene dichloride from the higher boiling chlorinated materials found in the bottoms fraction of a heavy ends column in a vinyl chloride monomer plant is carried out by passing the bottoms fraction to a vaporization zone maintained at about 112° C. The ethylene dichloride rich overhead from the vaporization zone is then passed to a fractionation column maintained between about 87° and about 117° C. The overhead from the fractionation column contains ethylene dichloride essentially free of higher boiling chlorinated materials and tars. This ethylene dichloride purified of "tars and carbon" and containing principally only 1,1,2-trichloroethane impurity, can be returned to the conventional VCM process distillation purification system which then separates this stream to yield high-quality ethylene dichloride for use as feed to an ethylene dichloride pyrolysis unit or for production of saleable ethylene dichloride product of high commercial quality.

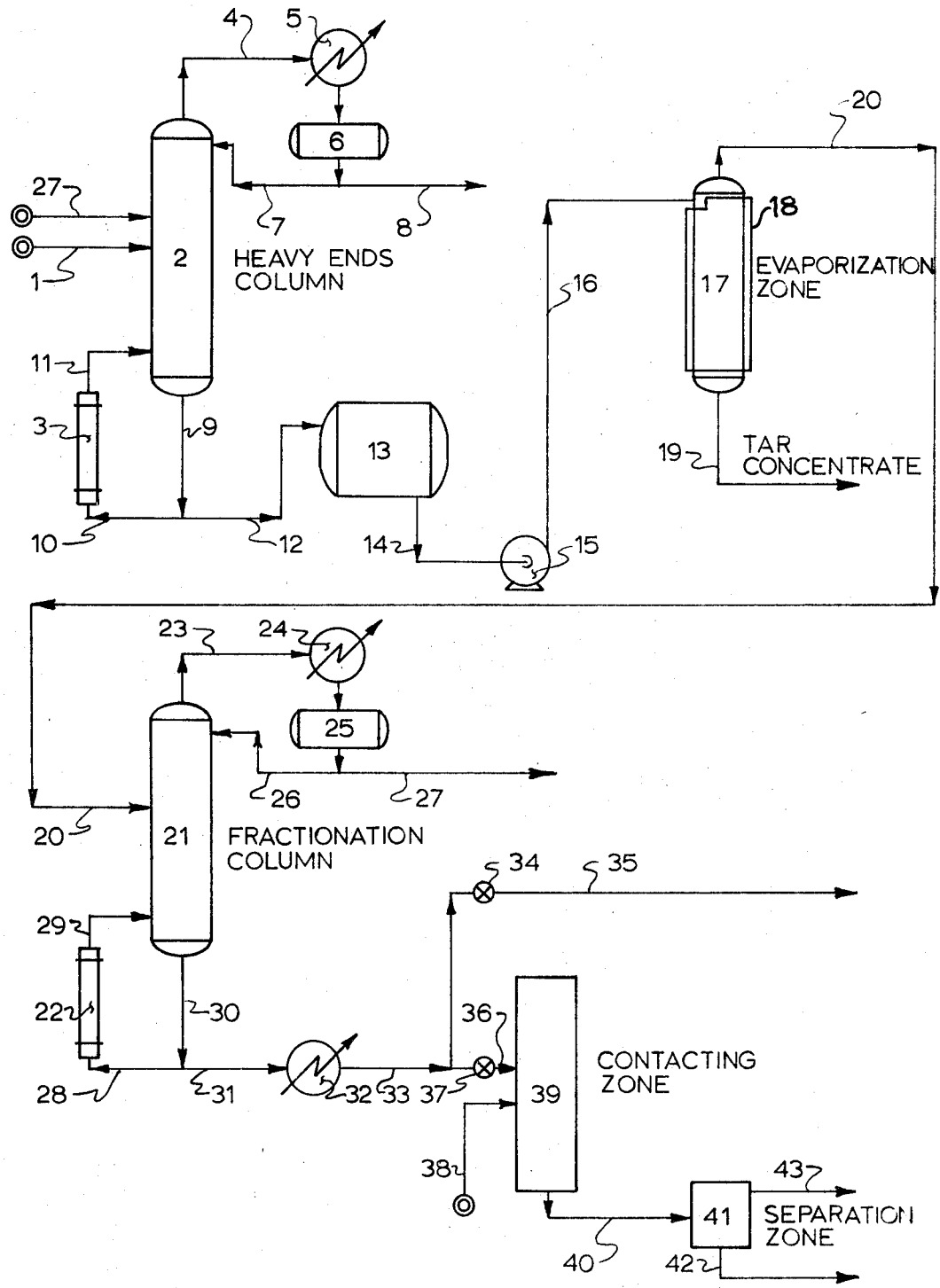

ETHYLENE DICHLORIDE PURIFICATION BY PLURAL STAGE DISTILLATION

The present invention relates to the purification of chlorinated hydrocarbon mixtures containing high-boiling impurities and tars. More specifically, this invention relates to the purification of the bottoms fraction from the heavy ends column in the distillation purification of a vinyl chloride monomer plant.

In a vinyl chloride monomer plant based on ethylene, there are three related reaction sections. In one section ethylene is addition chlorinated to produce, chiefly, ethylene dichloride. The second section consists of thermal pyrolysis of purified ethylene dichloride giving rise to production of vinyl chloride monomer and hydrogen chloride coproduct. The third section comprises an oxychlorination section for reaction of byproduct hydrogen chloride derived from the second section or hydrogen chloride from other sources with ethylene to produce ethylene dichloride. The ethylene dichloride produced by the first and third reaction sections heretofore mentioned is then purified by fractional distillation and purified ethylene dichloride is introduced into the pyrolysis section.

Crude ethylene dichloride produced by ethylene addition chlorination and (to a slightly greater extent) by oxychlorination of ethylene contains a number of low-boiling impurities as well as a number of high-boiling impurities. The low-boiling impurities include, ethylchloride, 1,1-dichloroethane, cis and trans 1,2-dichloroethylene, chloroform and trichloroethylene and they are removed as overhead from the first column of such an ethylene dichloride distillation purification system. The bottoms product of the light ends removal column is then fed to a heavy ends removal column in which purified ethylene dichloride is removed as overhead product while the bottoms of the heavy ends removal column contains varying amounts (depending on operation and design) of residual ethylene dichloride and all of the high-boiling impurities such as 1,1,2-trichloroethane, tetrachloroethanes, pentachloroethane, several dichloro and trichlorobutanes-butenes, and "tars."

The literature is unclear as to the degree of concern, on the part of producers and investigators, for optimizing the recovery of ethylene dichloride as well as other useable chlorohydrocarbon impurities existing in the bottoms of a heavy ends column system in a vinyl chloride process.

An object of this invention is to improve the yield of ethylene dichloride in the distillation purification of ethylene dichloride containing the conventional higher boiling impurities and tars. This composition is present in the feed to a heavy ends column normally found in the ethylene dichloride distillation purification system of a vinyl chloride monomer plant.

Another object is to recover a maximum of useful byproducts from a modern ethylene based vinyl chloride monomer plant, which byproducts are suitable for perchlorination reaction to produce $CCl_4$ and $C_2Cl_4$.

Another object is to prepare a suitable chlorinated hydrocarbon feed for a commercial anhydrous-type perchlorination process from normally wasted byproducts obtained and rejected from a modern all ethylene based and balanced (including ethylene oxychlorination) vinyl chloride monomer process.

Another object is to recover a clean, concentrated fraction of 1,1,2-trichloroethane for subsequent chemical use, such as, e.g., the hydrolysis of the 1,1,2-trichloroethane therein to vinylidene chloride (a useful product requiring only distillation purification).

Yet another object is to improve the long-term heat transfer characteristics of the reboiler associated with the heavy ends column.

Still another object is to prepare a suitable chlorinated hydrocarbon feed to be used in a commercial perchlorination process, which is tolerant of water, from normally wasted byproducts obtained and rejected from a modern, all ethylene based, vinyl chloride monomer process.

Yet another object of this invention is to remove a substantial percentage of bis-(2-chloroethyl) ether from the otherwise useful products from a modern, balanced ethylene based vinyl chloride monomer plant.

Further objects and advantages of the present invention will become apparent to those skilled in the art of the following description and disclosure.

A stream of bottoms material is normally continuously removed from the heavy ends column of a vinyl chloride process. This stream contains from 10 to a maximum of 80 mol percent ethylene dichloride, the balance being, principally, 1,1,2-trichloroethane, tetrachloroethanes, pentachloroethane, chlorinated butanes-butenes and "tars." In the practice of this invention, the bottoms stream is fed to a vaporization zone wherein the nonvolatile "tars" leave the zone as a viscous but free-flowing liquid stream due to the 1,1,2-trichloroethane contained therein. The vaporous effluent from the vaporization zone containing ethylene dichloride, 1,1,2-trichloroethane, tetrachloroethanes, and chlorobutanes-butenes is passed to a distillation zone. The overhead from the distillation zone contains essentially water-white, purified ethylene dichloride. This stream is recycled as feed to the previously mentioned heavy ends column to recover highly purified ethylene dichloride which is suitable, e.g., for pyrolysis to vinyl chloride and hydrogen chloride. The bottoms from the distillation zone contain, primarily, 1,1,2-trichloroethane and higher boiling chlorinated hydrocarbon compounds such as 1,1,2,2- and 1,1,1,2-tetrachloroethane, pentachloroethane, bis-dichloro diethyl ether, and various dichloro- and trichlorobutenes. The bottoms are essentially clear and relatively free of nonvolatile matter and "tars." These bottoms provide suitable feed to a perchlorination process which is tolerant of the water formed from the perchlorination of the bis-(2-chloroethyl) ether. A perchlorination process tolerant of water (see U.S. Pat. No. 2,746,998) is one which condenses the products leaving the reactor in an acid resistant contactor column in which water, constant boiling mixture (22 percent by weight HCl, 78 percent by weight $H_2O$) hydrochloric acid or a mixture of the two is used as the quench medium to remove hydrogen chloride from the vapor leaving the quench zone and to condense crude carbon tetrachloride and perchloroethylene.

Preferably, bottoms from the distillation zone undergo further treatment for the removal of bis-(2-chloroethyl) ether. The chlorinated product from such treatment is suitable feed, in whole or in part, for an anhydrous perchlorination process. By the term anhydrous perchlorination process is meant a thermal, vapor phase perchlorination reaction of hydrocarbons having from one to and including four carbon atoms and their partially chlorinated derivatives at a temperature between about 450° to about 650° C. This perchlorination takes place in the presence of an excess of chlorine with or without a diluent such as carbon tetrachloride and $C_2Cl_4$ such that the net products are, principally, $CCl_4$ and $C_2Cl_4$ with byproduct HCl formation. $CCl_4$ and $C_2Cl_4$ are then recovered by partial condensation under anhydrous conditions.

Having thus described the process of the present invention in general terms, reference is now made to the FIGURE which illustrates, diagrammatically, in elevation, one specific embodiment of the process of the present invention.

A liquid containing ethylene dichloride, 1,1,2-trichloroethane, tetrachloroethanes, pentachloroethane, bis-(2-chloroethyl) ether, and tars is introduced via line 1 to the feed plate of heavy ends distillation column 2. A preferred source of the feed to column 2 is the bottoms from a light ends removal column in a vinyl chloride monomer process. Ethylene dichloride recovered in the fractionation column 21 of this purification system is recycled via line 27 to column 2 and used as part of the feed. Overhead vapor is passed in line 4 to reflux condenser 5. Condensate containing ethylene dichloride is collected in reflux collector 6. A portion of the condensate is returned via line 7 to provide reflux in column 2 and the remainder is withdrawn in line 8.

A liquid stream is withdrawn from the base of column 2 in line 9 which contains essentially all the high-boiling impurities as well as varying amounts of ethylene dichloride (which keeps the boiling point of the bottoms depressed depending on operating pressure). A portion of the liquid is returned to column 2 via line 10, reboiler 3, which provided the necessary boilup for the system, and line 11. By way of example, a bottoms temperature of 108 C. is obtained at a system pressure of 5 p.s.i.g. at the base of column 2 for a typical 50 mol percent ethylene dichloride content bottoms. A bottoms temperature of 130° C. is obtained in another unit operated at 22 p.s.i.g. column bottoms pressure employing an ethylene dichloride concentration of 60 mol percent. The liquid in line 12 flows by gravity to a process surge tank 13.

The material in line 14 is pumped via pump 15 through line 16 to a thin-film evaporator 17 which is maintained at slightly above atmospheric pressure on the process side. Steam under pressure (e.g., 100 p.s.i.g.) is supplied to jacket 18. Heat transfer through the wall of evaporator 17 vaporizes, preferably, from 80 to 95 percent of the feed which is withdrawn overhead in line 20. The remaining 5 to 20 percent of the feed is a black, mobile liquid containing about 79–85 percent chlorine and commonly referred to as tar concentrate. "Tar" concentrate is withdrawn in line 19. This material can be incinerated for recovery of chlorine values as hydrogen chloride by combustion at high temperatures in a commercial atomizer-burner system. Ninety preferably 94 to 97 mole percent of the ethylene dichloride, 1,1,2-trichloroethane, tetrachloroethanes and dichloro- and trichloro butanes-butenes in line 16 leave evaporation zone 17 as overhead in line 20 leaving only enough ethylene dichloride, 1,1,2-trichloroethane, dichloro and trichloro butanes-butenes in the tar, line 19, to make it free flowing.

The clean, essentially tar-free, overhead vapor in line 20 is fed to tray 15 of a 30 sieve plate fractionation column 21 which operating with steam-heated reboiler 22 under proper reflux ratio conditions yields about a 98 percent ethylene dichloride overhead which is withdrawn in line 23. Overhead vapor is passed in line 23 to reflux condenser 24. Condensate containing ethylene dichloride is collected in reflux collector 25. A portion of the condensate is returned via line 26 to provide reflux in column 21 and the remainder is withdrawn in line 27 as a liquid and is recycled as a part of the feed to the aforementioned column 2 for maximum efficient recovery of ethylene dichloride.

Bottoms stream 30, from column 21, is withdrawn as a liquid containing about 75 to 85 percent 1,1,2-trichloroethane but containing small amounts of tetrachloroethanes, pentachloroethane, bis-(2-chloroethyl) ether and various dichloro and trichlorobutanes-butenes. A portion of the liquid in line 30 is returned to column 21 via line 28, reboiler 22, which provides the necessary boilup for the system and line 29. Stream 31 is a clean stream which can be next passed through the water-cooled heat exchanger 32 exiting at near cooling water temperature in line 33. The liquid in line 33 is suitable for use as chlorohydrocarbon feed thru valve 34 via line 35, in whole or in part, in a perchlorination process which employs wet recovery of the hydrogen chloride and chlorinated hydrocarbons exiting the perchlorination reaction zone. Such a perchlorination process is described in U.S. Pat. No. 2,746,998. The liquid in line 33 can be made suitable feed for an anhydrous perchlorination process by passing the liquid thru valve 37.

Stream 33 containing from 2 to 20 percent ethylene dichloride but preferably 2 to 5 percent ethylene dichloride then passes through valve 37 via line 36 to a vigorous contacting zone 39; as for example, a pulse column, highly agitated tank(s) in series, or a circulating centrifugal pump and bypass system. Through line 38, for example, an equivalent volume (based on chlorinated hydrocarbon feed) of 96 percent sulfuric acid is added to zone 39. Contact in zone 39 must be sufficient for removal of about 99.5 percent of the bis-(2-chloroethyl) ether as the 2-chloroethyl hydrogen sulfate if the chlorohydrocarbon organic phase remaining is to be used in an anhydrous perchlorination process. Suitable anhydrous perchlorination processes are disclosed in U.S. Pat. Nos. 2,442,324, and 2,857,438 as well as British Pat. No. 673,565. Then the displaced overflow of acid-organic phases from contact zone 39 passes through line 40 to phase separator 41 which provides adequate settling time for decantation of an overflow in line 43 which comprises a clear chlorohydrocarbon organic phase (essentially free of 2-chloroethyl hydrogen sulfate); and a spent acid phase underflow (free of chlorohydrocarbons) in line 42 containing 2-chloroethyl hydrogen sulfate.

If the chlorohydrocarbon distillate in line 33 is to be used in a perchlorination process as described in U.S. Pat. No. 2,746,998 then the material in line 33 does not require treatment with concentrated sulfuric acid for removal of bis-(2-chloroethyl) ether but can contain the bis-(2-chloroethyl) ether impurity and go directly to the reaction system of U.S. Pat. No. 2,746,998 as all or part of the chlorohydrocarbon feed to that process for production of carbon tetrachloride and perchloroethylene.

The long-term heat transfer characteristics of reboiler 3 is greatly improved by allowing a high content of ethylene dichloride to be present in stream 9. The tar constituents present in the base of this column are heat-sensitive and the reduction of temperature resulting from allowing higher ethylene dichloride content in the liquid effluent as well as the simultaneous improvement in temperature differential between the reboiler heat medium such as steam and the boiling liquid allows a higher heat transfer coefficient to be obtained in reboiler 3 for a longer time. The ethylene dichloride content in stream 9 is between about 10 and about 90 mole percent and preferably about 50 to about 80 mole percent.

Having thus described the invention in general terms with a description of one embodiment, reference is now had to specific examples which have been carried out in accordance with the techniques of the present invention.

EXAMPLE 1

220 gallons of the heavy ends column bottoms were withdrawn from a vinyl chloride monomer process. The heavy ends column was operating at atmospheric pressure and 83.9° C. at the top of the column and the liquid at the bottom of the column had a temperature of 107° C. The gas chromatograph analysis of the bottoms was:

|  | Mole % by G.C. |
|---|---|
| Ethylene dichloride | 41.3 |
| Trichloroethylene | 0.8 |
| 1,1,2-Trichloroethane | 47.4 |
| 1,2-Dichlorobutane | 1.6 |
| 1,3-Dichlorobutane | 2.2 |
| 1,1,1,2-Tetrachloroethane | 0.6 |
| Monochlorobenzene and/or 1,3-dichloro-2-butene | 0.4 |
| 1,1,2,2-Tetrachloroethane 1,4-dichloro-2-butene 1,4-dichlorobutane | 1.2 |
| 2,3,4-Trichloro-1-butene | 0.1 |
| 1,1,2-Trichlorobutane | 0.2 |
| bis-(2-chloroethyl) ether | 0.3 |
| 1,3,4-Trichloro-1-butene cis and trans (1,2,3-Trichlorobutane) | 0.2 |
| pentachloroethane | 0.5 |
| 1,2,4-Trichlorobutane | 0.2 |
| 1,2,4-Trichloro-2-butene | 0.6 |
| Nonvolatile tars | 2.4 |

The above bottoms material was then fed to a thin-film, fixed clearance blade, evaporator which is maintained slightly above atmospheric pressure. The bottoms were fed at a rate of about 125 lbs./hr. at a temperature of about 20° C. The temperature of the evaporator bottoms was about 112° C. The overhead vapor product rate was about 120 lbs./hr. and the underflow withdrawal rate of about 5 lbs./hr. These operating conditions provided a vaporous distillate consisting of 96.6 percent of the feed. The overhead distillate was condensed with water and was found, by analysis, to consist of:

| | Mole % by G.C. |
|---|---|
| Ethylene dichloride | 42.7 |
| Trichloroethylene | 0.9 |
| 1,1,2-Trichloroethane | 48.9 |
| 1,2-Dichlorobutane | 1.7 |
| 1,3-Dichlorobutane | 2.4 |
| 1,1,1,2-Tetrachloroethane | 0.8 |
| Monochlorobenzene or 1,3-Dichloro-2-butene | 0.3 |
| 1,1,2,2-Tetrachloroethane | |
| 1,4-Dichloro-2-butene | 1.0 |
| 1,4-Dichlorobutane 2,3,4-Trichloro-1-butene | 0.1 |
| 1,1,2-Trichlorobutane | 0.2 |
| Bis-(2-chloroethyl) ether | 0.1 |
| 1,3,4-Trichloro-1-butene cis and trans | 0.2 |
| 1,2,3-Trichlorobutane | |
| Pentachloroethane | 0.3 |
| 1,2,4-Trichlorobutane | 0.1 |
| 1,2,4-Trichloro-2-butene | 0.3 |

The liquid effluent leaving the bottom of the evaporator was analyzed as:

| | Mole % by G.C. |
|---|---|
| Ethylene dichloride | 3.0 |
| Trichloroethylene | Trace |
| 1,1,2-Trichloroethane | 5.3 |
| 1,2-Dichlorobutane | 0.3 |
| 1,3-Dichlorobutane | 0.9 |
| 1,1,1,2-Tetrachloroethane | 0.4 |
| Monochlorobenzene or 1,3-Dichloro-2-butene | 0.2 |
| 1,1,2,2-Tetrachloroethane | |
| 1,4-Dichloro-2-butene | 1.9 |
| 1,4-Dichlorobutane | |
| 2,3,4-Trichloro-1-butene | 0.1 |
| 1,1,1,2-Trichloro butane | 1.2 |
| Bis-(2-chloromethyl) ether | 2.8 |
| 1,3,4-Trichloro-1-butene cis and trans | 0.6 |
| 1,2,3-Trichlorobutane | |
| Pentachloroethane | 2.8 |
| 1,2,4-Trichlorobutane | 2.8 |
| 1,2,4-Trichloro-2-butene | 7.3 |
| Nonvolatile tars | 70.4 (by diffence) |

The above clear condensed overhead was then fed to the 15th plate of a 30-plate fractional distillation column at the rate of 340 gm. moles/hr. The overhead temperature in the column was 87° C. and the bottoms temperature was 117° C. The reflux ratio was 2:1. The cooling water was fed to the overhead condenser at a temperature of 17° C. while the steam fed to the reboiler was at 75 p.s.i.g. The overhead product rate was about 149 gm. moles/hr. while the bottoms withdrawal rate was about 190 gm. moles/hr. Under conditions of the pot, 97.5 percent of the ethylene dichloride was removed as overhead product found to have the following composition:

| Ethylene dichloride | 97.0 mole % |
|---|---|
| Trichloroethylene | 1.2 |
| 1,1,2-Trichloroethane | 1.8 |

The above 97.0 mole percent ethylene dichloride fraction was satisfactorily returned as feed to the ethylene dichloride heavy ends removal column, thus providing an extremely high and economic recovery of the desired ethylene dichloride.

EXAMPLE 2

This example shows the application of improved ethylene dichloride purification in a commercial plant where in addition to the normal bottoms of the heavy ends distillation column in the ethylene dichloride purification section of a vinyl chloride monomer plant based on ethylene and possibly containing an ethylene oxychlorination plant, there were usually present other various streams containing ethylene dichloride associated with higher boiling impurities, tars, and nonvolatile residues that were conveniently and economically added to the feed to the thin-film evaporator system for greater overall recovery of ethylene dichloride in the production of vinyl chloride monomer.

The thin-film evaporator was fed at a rate of 12.47 lb. moles/hr. The feed entered at a temperature of 100° C. and the temperature of the exiting vapor was 112° C. while the temperature of the bottoms was 115° C. An analysis of the streams showed minimal loss of ethylene dichloride thru such a purification system.

Feed to the Thin-Film Evaporator

Listing of Key Components only

| Ethylene dichloride | 4.14 lb. mols/hr. |
|---|---|
| Trichloroethylene | 0.06 |
| 1,1,2-Trichloroethane | 5.31 |
| Various higher boiling chloro $C_2$'s and $C_4$'s | 1.00 |
| Bis-(2-chloroethyl) ether | 0.81 |
| Tars and nonvolatiles | 1.15 |
| Total | 12.47 |

Overhead from the Thin-Film Evaporator

| Ethylene dichloride | 4.13 lb. mols/hr. |
|---|---|
| Trichloroethylene | 0.06 |
| 1,1,2-Trichloroethane | 5.16 |
| Various higher boiling chloro $C_2$'s and $C_4$'s | 0.95 |
| Bis-(2-chloroethyl) ether | 0.53 |
| Total | 10.83 |

The overhead from the thin-film evaporator was fed to the 15th plate of a 30 sieve plate fractionation column equipped with an overhead condenser and thermosiphon reboiler. The temperature of the overhead leaving the fractionator was 87° C. and the liquid entered the reboiler at a temperature of 117° C. The fractionator was run at about atmospheric pressure with steam being fed to the reboiler at 75 p.s.i.g. and the cooling water entered the condenser at 17° C.

Bottoms from the Thin-Film Evaporator

Listing of Key Components only

| Ethylene dichloride | 0.01 lb. mols/hr. |
|---|---|
| Trichloroethylene | — |
| 1,1,2-Trichloroethane | 0.15 |
| Various higher boiling chloro $C_2$'s and $C_4$'s | 0.05 |
| Bis-(2-chloroethyl) ether | 0.28 |
| Tars and nonvolatiles | 1.15 |
| Total | 1.64 |

Overhead from the Fractionator

| Ethylene dichloride | 4.05 lb. mols/hr. |
|---|---|
| Trichloroethylene | 0.06 |
| 1,1,2-Trichloroethane | 0.08 |
| Total | 4.19 |

Underflow from the Fractionator

| Ethylene dichloride | 0.08 lb. mols/hr. |
|---|---|
| Trichloroethylene | Trace |
| 1,1,2-Trichloroethane | 5.08 |
| Various higher boiling chloro $C_2$'s and $C_4$'s | 0.95 |
| Bis-(2-chloroethyl) ether | 0.53 |
| Total | 6.64 |

EXAMPLE 3

The bottoms of the heavy ends column, operated at atmospheric pressure with a bottoms liquid temperature of 107° C., in the ethylene dichloride purification system of an ethylene based process to produce ethylene dichloride (and vinyl chloride monomer) was found to contain:

| Ethylene dichloride | 4.14 lb. mols/hr. |
|---|---|
| Trichloroethylene | 0.06 lb. mols/hr. |
| 1,1,2-Trichloroethane | 5.31 lb. mols/hr. |

| Chloro C₄'s | 0.64 lb. mols/hr. |
|---|---|
| Bis-(2-chloroethyl) ether | 0.81 lb. mols/hr. |
| Tars and nonvolatiles | 1.15 lb. mols/hr. |
| Total | 12.11 lb. mols/hr. |

This material was fed to a "tar still" which can be described as a jacketed, indirect steam heated, and agitated kettle which had capacity for continuously vaporizing to a fractionation column the following vapor feed:

| Ethylene dichloride | 4.00 lb. mols/hr. |
|---|---|
| Trichloroethylene | 0.06 lb. mols/hr. |
| 1,1,2-Trichloroethane | 5.00 lb. mols/hr. |
| Chloro C₄'s | 0.52 lb. mols/hr. |
| Bis-(2-chloroethyl) ether | 0.52 lb. mols/hr. |
| Total | 10.10 lb. mols/hr. |

The "tar still" was operated under a pressure of 3 p.s.i.g. with a steam pressure in the jacket of 100 p.s.i.g. The temperature of the feed was 100° C. and the overhead had a temperature of 106° C. while the temperature of the bottoms was 112° C.

The ethylene dichloride 1,1,2-trichloroethane fractionation column was a multisieve tray column, fitted with reboiler and overhead condenser providing 1.5 times minimum reflux ratio based on 1,2-dichloroethane and 1,1,2-trichloroethane as key components. When the tar still, and fractionation column reached steady-state conditions (constant withdrawals), the following stream analyses and flows were found:

Tar Still Liquid Effluent

| Ethylene dichloride | 0.14 lb. mols/hr. |
|---|---|
| Trichloroethylene | Trace lb. mols/hr. |
| 1,1,2-Trichloroethane | 0.31 lb. mols/hr. |
| Chloro C₄'s | about 0.12 lb. mols/hr. |
| 2-Chlorodiethyl ether | 0.29 lb. mols/hr. |
| Tars and nonvolatiles | about 1.15 lb. mols/hr. |
| Total | 2.01 |

EDC*-1,1,2-Trichloroethane 1,2-Trichloroethane Fractionation Column Overhead

Product

| Ethylene dichloride | 3.90 lb. mols/hr. |
|---|---|
| Trichloroethylene | 0.04 lb. mols/hr. |
| 1,1,2-Trichloroethane | 0.15 lb. mols/hr. |
| Chloro C₄'s | 0.22 lb. mols/hr. |
| Total | 4.31 |

EDC*-1,1,2-Trichloroethane Fractionation Column Underflow

Product

| Ethylene dichloride | 0.10 lb. mols/hr. |
|---|---|
| Trichloroethylene | 0.02 lb. mols/hr. |
| 1,1,2-Trichloroethane | 4.85 lb. mols/hr. |
| Chloro C₄'s | 0.30 lb. mols/hr. |
| 2-Chlorodiethyl ether | 0.52 lb. mols/hr. |
| Total | 5.79 |

*EDC = ethylene dichloride

The above fractionation column overhead was fed to the heavy ends column of a conventional ethylene dichloride distillation purification system as found in a vinyl chloride plant based on ethylene raw material.

The tar still underflow was a viscous but pumpable liquid which was sent to an incinerator for combustion to (recoverable) HCl, $CO_2$ and $H_2O$ or was discarded.

This showed an efficient recovery of ethylene dichloride with a minimal loss in the tars that remained.

EXAMPLE 4

A composition the same as in example 3 was fed into a vaporizer system comprising a flash pot with a liquid temperature of 112° C., a vapor temperature of 106° C. and a pressure of 3 p.s.i.g., a circulation pump and a steam heated exchanger with an inlet temperature of 112° C., an outlet temperature of 120° C. and a pressure of 25 p.s.i.g.

Such a system is described in Chemical Engineering Progress, Volume 54, number 10, pp. 64–67. In this system, the liquid was pumped through the heat exchanger into the flash pot. A pressure control valve in the line between the exchanger and the flash pot was set so that no vaporization could occur in the steam-heated exchanger. The centrifugal pump provided a high circulation rate so that an excellent heat transfer coefficient was obtained in the steam-heated exchanger. The temperature of the circulating liquid rose only 8° C. in passing through the exchanger, with the circulation rate high enough so that the vapor rate from the flash pot was:

| Ethylene dichloride | 4.00 lb. moles/hr. |
|---|---|
| Trichloroethylene | 0.06 |
| 1,1,2-Trichloroethane | 5.00 |
| Chloro C₄'s | 0.52 |
| Bis-(2-chloroethyl) ether | 0.50 |
| Total | 10.08 lb. moles/hr. |

This vapor was fed into a fractionating column of the same design as in example 3.

A small bleed was continuously taken from the flash pot. This stream had essentially the same composition and quantity as the tar still liquid effluent of example 3. Thus, this pumped through reboiler system was demonstrated to give identical results with jacketed agitated kettle described in example 3.

EXAMPLE 5

This example deals with the $H_2SO_4$ extraction of bis-(2-chloroethyl) ether from the trichloroethane fractionation column bottoms.

An operating unit was set up consisting of an agitated mixing tank which was covered and vented to a packed scrubbing tower and a circulating pump.

One hundred gallons of 96% $H_2SO_4$ were charged to the empty mixing tank.

One hundred gallons of the bottoms from the trichloroethane fractionation column were then charged to the 96% $H_2SO_4$ contents of the mixing tank.

The agitator was turned on and the circulating pump system was primed and started. Approximately 50 gallons per minute of a mixture of 96% $H_2SO_4$ and bottoms was circulated in the pump recycle system under conditions of good mixing of the two liquid phases in the agitated tank.

After 30 minutes mixing and circulation, the agitator and circulating pump were turned off. The contents of the circulating piping and pump were drained and returned to the mixing tank.

After 10 minutes settling time the "partially spent" 96% $H_2SO_4$ was drained from the mixing tank and discarded.

Then 100 gallons of fresh 96% $H_2SO_4$ were charged to the residual settled bottoms remaining in the kettle.

The 30 minute mixing procedure was repeated followed by return of the circulating piping and pump contents to the mixing tank. The contents of the mixing tank were allowed to settle for a period of 30 minutes, the $H_2SO_4$ layer was withdrawn leaving a clear body of treated bottoms.

Following are pertinent analytical results for the foregoing steps:

The analyses of the bottoms prior to treatment with $H_2SO_4$ and after each treatment were as follows.

Fractionation Column Chlorinated Hydrocarbon Bottoms

Charged to The Mixing Tank

| Ethylene dichloride | 29.7 mol % |
|---|---|
| Trichloroethylene | 0.2 |

| | |
|---|---|
| 1,1,2-Trichloroethane | 46.6 |
| 1,2-Dichlorobutane | 1.8 |
| 1,3-Dichlorobutane | 4.2 |
| 1,1,1,2-Tetrachloroethane | 0.5 |
| Monochlorobenzene and 1,3-dichloro-2-butene | 0.4 |
| 1,1,2,2-Tetrachloroethane 1,4-Dichloro-2-butene | 0.8 |
| 1,4Dichlorobutane | |
| Bis-(2-chloroethyl) ether | 15.6 |

Fractionation Column Chlorinated Hydrocarbon Bottoms

After the First $H_2SO_4$ Mixing and Decantation Operation

| | |
|---|---|
| Bis-(2-chloroethyl) ether | <100 p.p.m. vol. * |

Fractionation Column Chlorinated Hydrocarbon Bottoms

After the Second $H_2SO_4$ Mixing and Decantation Operation

| | |
|---|---|
| Bis-(2-chloroethyl) ether | <100 p.p.m. vol.* |

* Limit of detection by thermal conductivity gas chromatographic analysis.

Having thus described the invention with reference to a specific example thereof, it is to be understood that many modifications, alterations and applications will become apparent to those skilled in the art without departing from the scope of the present invention and that the present invention is limited only by the claims.

We claim:

1. A process for the recovery of residual amounts of ethylene dichloride from the bottoms fraction of an ethylene dichloride distillation column comprising passing the bottoms fraction containing residual ethylene dichloride and high-boiling impurities to a vaporization zone maintained under conditions to separate, as overhead, an essentially tar-free vapor stream containing ethylene dichloride, passing the essentially tar-free vapor stream to a fractionation zone maintained under conditions to separate an overhead comprising ethylene dichloride from a bottoms fraction containing a major percentage of 1,1,2-tri-chloroethane and a small percentage of other chlorinated hydrocarbons.

2. The process of claim 1 in which the bottoms materials from the distillation column contains from about 10 mole percent to about 90 mole percent ethylene dichloride.

3. The process of claim 2 wherein the bottoms fraction containing a major percentage of 1,1,2-trichloroethane and a small percentage of other chlorinated hydrocarbons is then contacted with sulfuric acid.

4. The method of claim 2 wherein a portion of the overhead from the fractionation zone is recycled to the distillation column.

5. A process wherein crude ethylene dichloride containing low-boiling and high-boiling impurities is passed to a light ends distillation column and low-boiling impurities are removed as overhead and the ethylene dichloride and high-boiling impurities are removed as bottoms, the ethylene dichloride and high-boiling impurities are passed to a heavy ends distillation column in which ethylene dichloride is removed as overhead and residual ethylene dichloride and the high-boiling impurities are removed as bottoms materials, the improvement comprising, passing the bottoms materials containing residual ethylene dichloride and high-boiling impurities to a vaporization zone maintained under conditions to separate as overhead, an essentially tar-free vapor stream containing ethylene dichloride, passing the essentially tar-free vapor stream to a fractionation zone maintained under conditions to separate an overhead comprising ethylene dichloride from a bottoms fraction containing a major percentage of 1,1,2-trichloroethane and a small percentage of other chlorinated hydrocarbons.

6. The process of claim 5 in which the bottoms materials from the heavy ends distillation column contains from about 10 mole percent to about 90 mole percent ethylene dichloride.

7. The process of claim 6 wherein the bottoms fraction containing a major percentage of 1,1,2-trichloroethane and a small percentage of other chlorinated hydrocarbons is then contacted with sulfuric acid.

8. The process of claim 6 wherein a portion of the overhead from the fractionation zone is recycled to the heavy ends distillation column.

* * * * *